July 3, 1962 F. G. ETHERIDGE 3,042,344

PRESSURE PICK-UP FOR A JET ENGINE FUEL SYSTEM

Filed Nov. 26, 1956 4 Sheets-Sheet 1

INVENTOR.
FREDERICK G. ETHERIDGE

BY
Eugene O. Acheson
ATTORNEY

July 3, 1962 F. G. ETHERIDGE 3,042,344

PRESSURE PICK-UP FOR A JET ENGINE FUEL SYSTEM

Filed Nov. 26, 1956 4 Sheets-Sheet 2

INVENTOR.
FREDERICK G. ETHERIDGE

BY

ATTORNEY

PRESSURE PICK-UP FOR A JET ENGINE FUEL SYSTEM

Filed Nov. 26, 1956 4 Sheets-Sheet 3

INVENTOR.
FREDERICK G. ETHERIDGE
BY
Eugene O. Heberer
ATTORNEY

July 3, 1962 F. G. ETHERIDGE 3,042,344

PRESSURE PICK-UP FOR A JET ENGINE FUEL SYSTEM

Filed Nov. 26, 1956 4 Sheets-Sheet 4

*INVENTOR.*
FREDERICK G. ETHERIDGE

BY Eugene D. Lehner

ATTORNEY

United States Patent Office 3,042,344

Patented July 3, 1962

1

3,042,344

PRESSURE PICK-UP FOR A JET ENGINE FUEL SYSTEM

Frederick G. Etheridge, Whittier, Calif., assignor to North American Aviation, Inc.

Filed Nov. 26, 1956, Ser. No. 624,288

8 Claims. (Cl. 244—76)

This invention relates to a means to obtain an air reference pressure to regulate fuel flow to an aircraft jet engine at the correct rate over a specified range of flight Mach numbers, altitudes and angles of attack. Within these specified ranges are the design cruising conditions; that is, the constant speed, altitude and angle of attack at which the missile is expected to travel over the predetermined distance or period of flight. However, external forces cause the aircraft or missile to vary from the set cruising conditions and because of this an automatic means must be provided to vary the fuel rate to the engine.

In an aircraft, such as a guided missile, controlled by an automatic pilot, the latter may be designed to effect speed changes and restore the cruise condition, by causing the trim to be changed. That is, if the craft tends to increase speed beyond the predetermined Mach number, for example, in the range of Mach 2 to 6, the autopilot is so informed by a Mach sensing means and causes the craft to increase altitude. This causes the speed of the craft to be decreased which in turn changes the fuel requirement. Similarly, when the speed drops below that previously determined as that required, the autopilot operates to cause the aircraft to lose altitude and increase in speed. This, of course, requires an increase of fuel to the jet engine.

According to the present invention, it has been determined that the above fuel changes can be made by obtaining an air reference pressure which will enable the fuel to be metered to correct the fuel flow over specified ranges of missile flight Mach number, altitude and angle of attack. This is accomplished by mounting a pitot tube on a wedge so that the air flow is substantially parallel to the inclined surface of the wedge and to the axis of the pitot tube opening. In the past, pitot tubes have been mounted with their openings directed into the free air stream. Because a free stream pitot tube compresses the air to obtain pressure from velocity in an inefficient manner in one stage, it is sensitive to only large changes of Mach number and/or angle of attack. In contrast to the operation of a free stream tube, a pitot tube mounted on a wedge compresses the air in two stages, one in the oblique shock wave caused by the leading edge of the wedge and another at the normal shock wave at the pitot tube, and therefore, the latter is more efficient than a tube mounted in the free stream.

It is an object of this invention to provide an improved means to obtain an air reference pressure to regulate fuel to an aircraft ram or turbo jet engine at the correct rate over a specified range of flight Mach numbers, altitudes and angles of attack.

It is a principal object of this invention to provide an improved mounting means for a pitot tube on an aircraft.

It is a further object of this invention to provide wedge means for mounting a pitot tube and a static tube in combination.

Other objects of this invention will become apparent from the following description taken in connection with the accompanying drawings, in which FIG. 1 is a view of a ramjet powered aircraft using the present invention;

FIG. 2 is a side view of a pitot tube mounted on a wedge, showing the shock wave formations;

2

Figure 1:
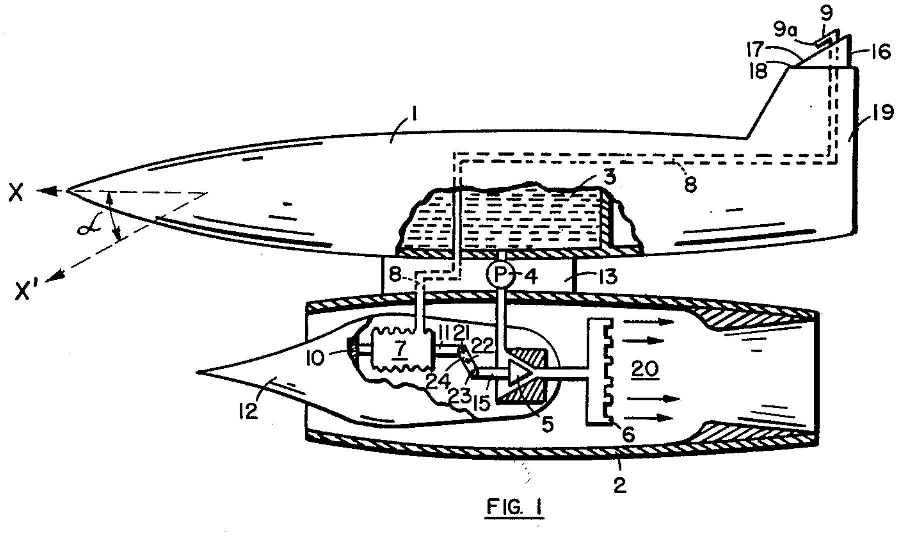

Referring to FIG. 1, an aircraft 1 is shown having a ramjet engine 2 secured thereto by means of a mounting pylon 13. Fuel tank 3 in the body of the aircraft contains fuel to be supplied to the engine by means of fuel pump 4, from which it passes through valve 5 into the fuel spray bars 6. Secured on a desirable external exposed portion of the aircraft, typically on top of the rudder 19, is a wedge 16 with its leading edge 18 directed forward into the air stream and having its inclined face 17 extending upwardly and rearwardly from said leading edge. Extending typically upwardly through wedge member 16 is a pitot tube 9, having its intake or open end *9a* directed forwardly and having the axis of said open end substantially parallel to the plane of inclined face 17. Pitot tube 9 is connected to a bellows 7 by means of connecting tube 8. Bellows 7 is rigidly mounted at one end in diffuser 12 by support means 10. Link 11 is secured to the other and flexible end of bellows 7 and to link 24 which is secured on fulcrum 22 and which turns on pivots 21 and 23. Link 15 is connected at one end to link 24 and its other end is connected to valve 5.

In the operation of the missile shown in FIG. 1, it can be seen that if an autopilot calls for a speed reduction by causing the aircraft to climb, the reference pressure developed in bellows 7 through pitot tube 9 would decrease and thus, effect a reduction in the flow of fuel to fuel spray bars 6. That is, bellows 7 would contract moving link 11 to the left in FIG. 1 and link 15 to the right to tend to close valve 5. This is necessary because as the speed is reduced, less fuel should be supplied to the combustion chamber 20. In a similar manner, if the autopilot called for an increase in speed, it would cause the aircraft to descend and increase the pressure within bellows 7, causing the fuel valve to open farther and allow more fuel, as required, into the combustion chamber.

Figure 2:
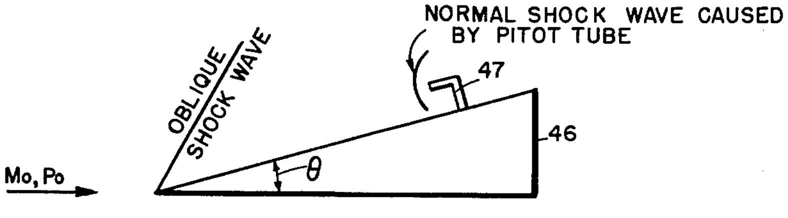

In FIG. 2, pitot tube 47 is shown to be mounted on a wedge 46, similar to that in FIG. 1. Wedge 46 is shown to have a deflection angle $\theta$ and extending upwardly from the leading edge is a line representing a typical oblique shock wave developed in the air stream where the aircraft or missile flight Mach number is $M_0$ and the ambient pressure is $P_0$. Also shown is a representative normal shock wave caused by the compressed air stream at the pitot tube. In this structure, a reference pressure $P_r$ is developed in the pitot tube.

Figure 3:
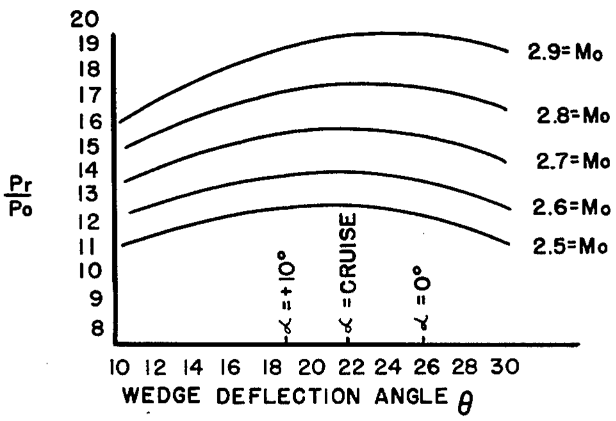
FIG. 3 is a graph showing the aerodynamic operating characteristics of the present invention.

The operation of the jet engine fuel control system may be expressed as $$\frac{W_f}{P_r}$$

equals a constant; where $W_f$ is the fuel rate in pounds per second and $P_r$ is a reference pressure in pounds per square feet, which may be developed in the pitot tube, as indicated. The operating characteristics of such an arrangement is illustrated, as shown in the graph in FIG. 3, where the ratio of reference pressure to ambient pressure is plotted against the wedge deflection angle $\theta$ over specified ranges of angle of attack $\alpha$ and Mach numbers $M_0$. As more clearly shown in FIG. 1, the angle of attack $\alpha$ is well known in the art to comprise, for example, that angle which is formed when the longitudinal axis X of the missile moves from the illustrated substantial horizontal reference plane position into a position X′. Experiments have shown that the maximum point on the curves for the ratio of reference pressure to ambient pressure occurs when the wedge deflection angle or the angle formed between the inclined surface and a substantially horizontal plane is in the range of 21° and 23° for the Mach numbers shown. When it is desirable to obtain a reduction in reference pressure ratio for all missile angles of attack, except at the cruise angle of attack and cruise Mach number, it follows, based on the information presented in FIG. 3, that a wedge having a deflection angle of approximately 21° to 23° is near optimum for the specified ranges covered in the tests. Therefore for optimum operation at a cruise Mach number of 2.5, the wedge is mounted so that when the missile assumes its cruise angle of attack position, then the angle between the inclined surface of the wedge and a horizontal reference plane is made to be approximately 21°. As can be seen in FIG. 3, for higher cruise Mach numbers, the optimum wedge angle becomes larger and vice versa for lower Mach numbers.

After selecting the wedge deflection angle, such as 22°, it is possible to replace the wedge deflection angles on the abscissa of the graph in FIG. 3 with the specified range of the angles of attack; that is, typically zero and 15° with the cruise angle of attack therebetween. Further, for a specified required Mach number, for example 2.7, it is seen in the graph that a reduction in Mach number is accompanied by a fairly large reduction in the pressure ratio $$\frac{P_r}{P_0}$$

This is in contrast to the reference pressure ratio developed in a free stream pitot tube. Experiments show that a free stream tube is insensitive to changes in Mach number, altitude, and angle of attack and therefore, a free stream tube is not satisfactory to obtain a reference pressure to regulate the fuel flow.

Diffuser instability is common to all supersonic ramjets and experience has shown that it is dangerous to operate an engine past its diffuser stability limit. In regard to diffuser instability, it has been found that for cruise angle of attack only a limited off design Mach number variation is permitted with a free stream pitot tube reference pressure but considerable off design Mach number variation is permitted by a wedge type pick-up. Further, for zero angle of attack, for example, the free stream pitot tube reference pressure is useless because it calls for engine operation in the region of diffuser instability. Under the same conditions, the wedge arrangement permits adjustment to the different flight conditions and provides a satisfactory control. With a fixed rate of fuel being delivered to the engine, as the missile is forced by outside influence to slow down or change its angle of attack, the diffuser, because of inherent characteristics, would be forced to operate in the instability area. The only way to avoid operation in the instability area is to lower the fuel rate and add less heat to the engine. Hence, it is necessary to have a reference pressure sensitive to change in Mach number, altitude, and angle of attack.

Because a free stream pitot tube compresses the air to obtain pressure from velocity in an inefficient manner, in one stage, it is insensitive to all but large changes in Mach number or of angle of attack. Since a pitot tube mounted on a wedge compresses the air in, effectively two stages, one at the shock wave caused by the leading edge of the wedge and another at the normal shock at the pitot tube, it is efficient as is shown in the above graph. The curves in FIG. 3 show a peak of such efficiency at a wedge angle of approximately 22°. As the angle between the wedge face on which the pitot tube is mounted and free air stream is changed, the efficiency varies and the pitot tube becomes sensitive, because of the efficiency change, to changes in Mach number and angle of attack. Hence, a pitot tube, mounted as shown in FIG. 1, meets the requirement of being sensitive to changes in Mach number, altitude, and angle of attack. That is, as the angle of attack varies from cruise angle or as the Mach number decreases or increases, the reference pressure is changed, so as to change the fuel rate by actuation of bellows 7.

Figure 4:
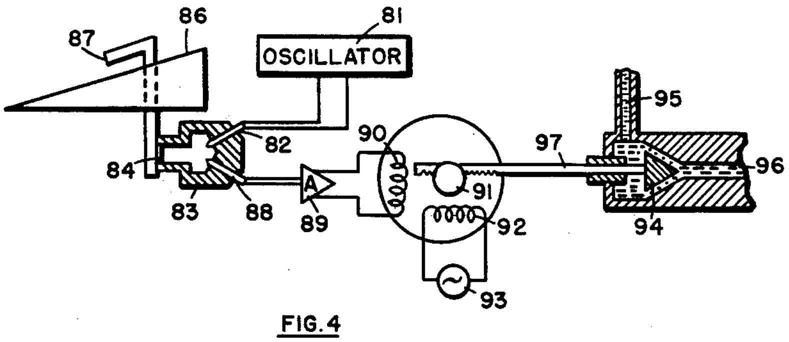
FIG. 4 is a schematic view of a means to correct fluid pressure in the present invention to an electrical signal for operating the fuel valve.

Another method of actuating the fuel valve as a function of the pressure change in the pitot tube is by means of a pressure transducer which converts fluid pressure to an electrical signal. In FIG. 4, pitot tube 87 is shown mounted on wedge 86 connected to supply air under pressure to the diaphragm 84 of pressure pick-up 83. Oscillator 81 furnishes an electric signal of sonic or supersonic frequency to ceramic crystal transmitter 82 which in turn transmits a wave signal to diaphragm 84. The wave signal from crystal 82 to a diaphragm 84 is reflected to recovery crystal 88 which transmits a signal to servo amplifier 89 which amplifies the signal and provides the input to control winding 90 of servo motor 91. In quadrature with control winding 90 is winding 92 which receives the alternating current signal from source 93. On the shaft of servo motor 91 may be a fine-toothed pinion, not shown, engaged with rack 97 which forms the valve stem of valve 94. Fuel flows from the fuel tank through line 95 through valve 94 and line 96 into the jet engine combustion chamber.

Pressure pick-up 83 may be calibrated so that the pressure developed in pitot tube 87 at cruise condition will provide the proper signal to crystal receiver 88 so that servo motor 91 will hold valve 94 in the position to provide the proper fuel. When the pressure is increased in pitot tube 87, moving the central surface of diaphragm 84 to the right in the drawing, the pressure will change so that the signal as amplified in amplifier 89 will cause motor 91 to rotate in the counterclockwise direction and allow more fuel to pass through valve 94. When the pressure is reduced, the action of motor 91 will similarly move valve 94 toward the closed position.

Figure 5:
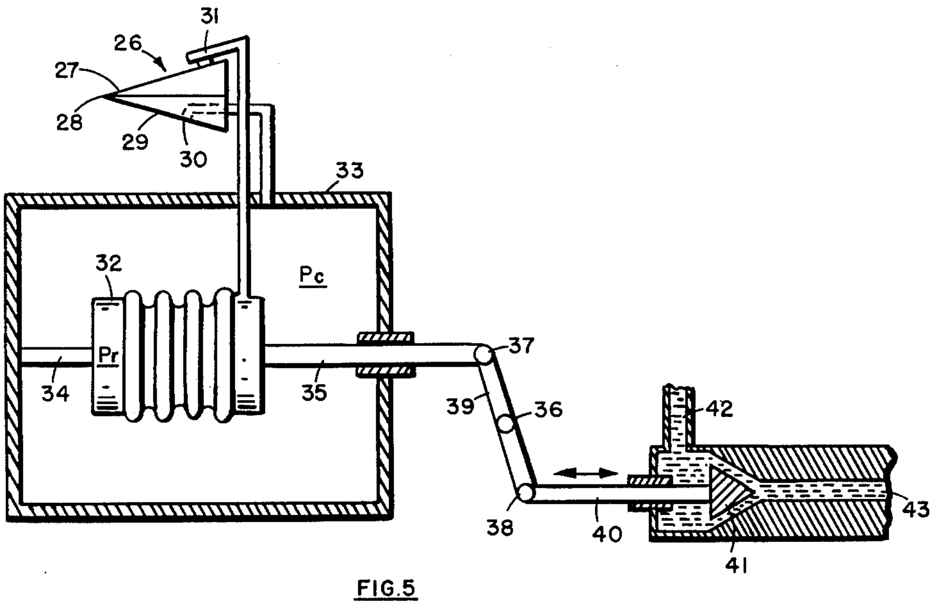
FIG. 5 is a schematic view showing the use of the present invention in which a pitot tube and a static tap are mounted on reverse sides of a double wedge.

In FIG. 5, a wedge 26, which is equivalent to two wedges in back-to-back relationship, is shown having a rearwardly and upwardly inclined surface 27 and a rearwardly and downwardly inclined surface 29, both extending from leading edge 28. A pitot tube 31 is directed forward adjacent surface 26, having its axis substantially parallel thereto, and in the same manner as in FIG. 1, is connected to a bellows 32, said bellows being rigidly mounted at one end by a support means 34 in a sealed chamber 33. Open to the lower inclined surface 29 is a static tube 30 which is connected to supply a static pressure to chamber 33. Another method of obtaining the static pressure would be to have a static tube connected to be open to the same inclined surface from which the pitot tube extends.

Bellows 32 is connected at its flexible end to a link 35 which, in turn, is connected to link 39, having a fulcrum 36 so as to be rotatable at pivots 37 and 38 by means of lateral movement of link 35. Connected to the other end of link 39 is link or valve rod 40 which serves to close and open fuel valve 41 when bellows 32 is compressed or expanded, respectively. Fuel is supplied through valve 41 from tank line 42 and is delivered to a jet engine through line 43.

Figure 6:
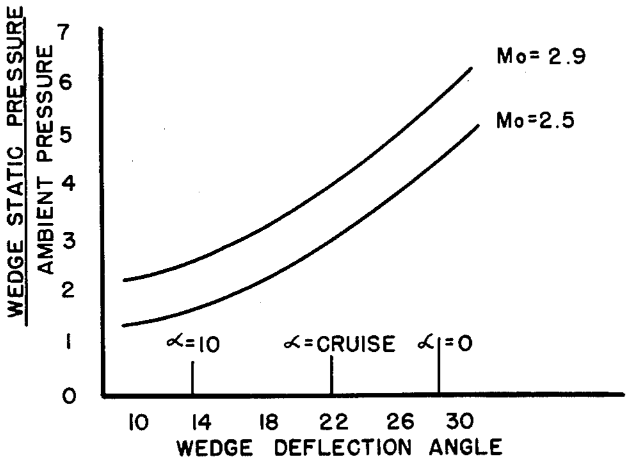
FIG. 6 is a graph in which the ratio of wedge static pressure to ambient pressure is plotted against wedge deflection angle.

From the system shown in FIG. 5, additional variation in reference pressure is accomplished in the subtraction of the static pressure on face 29 of wedge 26 from the pitot tube pressure obtained along face 27. The operation of the system shown in FIG. 5 is influenced, as shown in FIG. 6, by the ratio of the wedge static pressure to ambient pressure which is plotted against wedge deflection angle for desirable ranges of angle of attack and Mach number. As the wedges rotate toward lower angles of attack, the pitot tube pressure on face 27 will decrease, as shown in FIG. 3, at the same time the static pressure is increasing, shown in FIG. 6, the net result being that a greater force is brought to bear in the direction required to reduce fuel flow than is possible with the single wedge.

In the operation of the system shown in FIG. 5, a change in the wedge pitot pressure, $P_r$, developed on inclined surface 27, will cause a displacement of the bellows 32. For example, an increase in $P_r$ will cause valve 41 to open further to allow desired increase in fuel flow. The actual displacement of the bellows is also a function of the pressure $P_c$, surrounding the bellows in chamber 33. As $P_r$ is also a function of altitude, $P_c$ must be carefully determined so that at the higher altitudes $P_c$ will not act to overly restrict the bellows displacement. In some engines, it might be preferable that $P_c$ be a vacuum or very low constant pressure. In the system shown in FIG. 5, $P_c$ is a function of the altitude, Mach number and angle of attack and thus, does not act to overly restrict the bellow displacement at the higher altitude.

Figure 7:
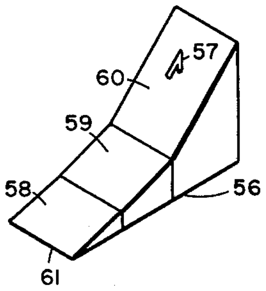
FIG. 7 shows an embodiment of the present invention in which multiple wedges are used.

In FIG. 7, another embodiment of the present invention is shown. Wedge 56 has 3 inclined surfaces 58, 59 and 60. Surface 58 extends rearwardly and upwardly from the leading edge 61 and surfaces 59 and 60 extend successively and rearwardly upward from surface 58. Pitot tube 57 is shown mounted on the third surface 60 and has its open end facing the forward direction with its open end's axis substantially parallel and juxtaposed to the plane of face 60. With this structure, pressures of a higher magnitude may be obtained than with a single inclined face. That is, a pitot tube mounted on face 60 delivers a higher pressure than that would deliver if mounted on face 58. This embodiment is effective where a high reference pressure is desirable.

Figure 8:
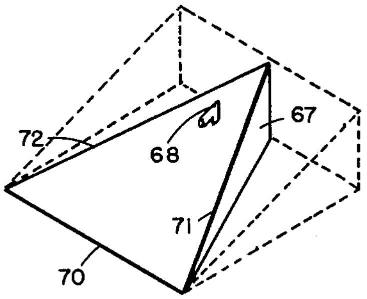
FIG. 8 is a view of the present invention showing the location of the pitot tube on the wedge with respect to Mach lines.

In mounting the pitot tube pick-up it may be necessary or desirable to alter the shape of the wedge to reduce aerodynamic drag or to merely facilitate mounting. Such alterations are permissible if they do not violate the following experimentally determined conditions: (1) the leading edge of the wedge must be a knife edge of a certain critical length; (2) the pitot tube or static tap must be mounted forward of the intersection of the Mach lines generated on the corners of the leading edge of the wedge; that is, the tube intake must be in a field bounded by Mach lines, in which all points on the wedge have the same pressure; (3) the pitot tube must be mounted with its intake opening above or out of the inflight boundary layer formed on the inclined surface; and (4) the tube must be in the flow field or path of the oblique shock wave formed on the leading edge of the wedge. In FIG. 8, for example, the solid lines form the essential structure of wedge 67. Lines 71 and 72, extending from leading edge 70, indicate the approximate Mach lines that would be developed on the corners of the leading edge, such as 70. That is, the wedge could be no smaller in width than the distance between lines 71 and 72, but could have been reduced to its present size from what might have been the initial outline as shown by the broken lines. In other words, pitot tube 68 must be exposed to the pressure developed on the inclined surface between the lines 71 and 72. Consistent with this, the wedge could be cut off anywhere aft of the pitot tube shown.

Figure 9:
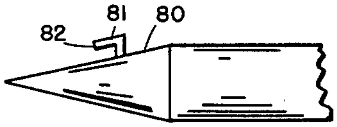
FIG. 9 is a side view of a pitot tube mounted on the surface of a cone.
Figure 10:
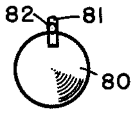
FIG. 10 is a front view of the invention shown in FIG. 9.

It has been found that other inclined surfaces, similar to wedges in profile, may be used to mount pitot tubes thereon. In FIGS. 9 and 10, for example, a pitot tube 81 is shown extending from a cone 80. Pitot tube 81 is directed forward, having the axis of its open end or intake

82 substantially parallel to the external surface of cone 80. Tests have been made with such configurations shown in FIGS. 9 and 10, and a satisfactory reference pressure was found to have developed in the tube so as to be usable to meter fuel under conditions described relative to the embodiments of the present invention shown. There are no Mach lines formed on the vertex of a cone and thus, the location of the tube intake is not limited by them.

Other forms of inclined mounting surfaces may be used, such as two adjacent sides of a pyramid which has its top directed forward. Pitot tubes may be mounted on at least two of the adjacent sides of the pyramid and connected to a common line connected to a bellows, as shown in FIG. 1, to actuate a fuel valve.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A pressure control system in combination with a vehicle formed on a longitudinal axis and having a forward and rearward end, said vehicle having a jet engine, said system comprising: a wedge type member secured on the rearward end of said vehicle and comprising at least one inclined surface portion forming a set angle relative to said longitudinal axis, said wedge type member extending in a rearward direction and terminating at a forward end thereof in a generating means for generating an oblique shock wave when said wedge type member moves relative to an aerodynamic environment at a predetermined range of supersonic speeds, altitude and when said longitudinal axis forms a predetermined angle of attack; pitot tube means secured to said wedge type member at a fixed distance rearward of said generating means and so positioned on said wedge type member so as to face the forward end of said vehicle to generate a normal shock wave adjacent thereto during said predetermined range of supersonic speeds, altitude and angle of attack; control means operatively connected to said pitot tube means; means connecting said control means to the engine of said vehicle for selectively controlling the thrust thereof dependent on the changes in pressure losses occurring through said generated oblique shock wave and said normal shock wave and sensed by said pitot tube means.

2. The invention of claim 1 wherein: said wedge type member comprises a first and a second inclined surface rearwardly diverging from said generating means, said first and second surfaces constructed and arranged to form an angle between 10° and 30° with respect to the longitudinal axis of said vehicle; said pitot tube means secured to the first inclined surface of said wedge means; static orifice means formed in said wedge means and terminating at the second inclined surface of said wedge means, said static orifice means positioned rearward of said generating means; said control means operatively connected to said static orifice means by said means connecting said control means to said engine and operative to compare pressures sensed by said pitot tube means and said static orifice means so as to be adapted to selectively control the thrust of an engine.

3. The invention of claim 1 wherein said wedge means comprises a plurality of successive rearwardly inclined planar surfaces, each successive surface inclining more than the adjacent forward surface.

4. The invention of claim 1 wherein said wedge type member comprises a conical surface diverging rearwardly from said generating means.

5. A pressure control system in combination with an aircraft formed on a longitudinal axis and having an engine secured to a rearward end thereof, said control system comprising: a wedge type member having a fore and rear portion connected together by an inclined surface portion which forms a set angle relative to said longitudinal axis, and arranged to face in a forward direction, said wedge type member fixedly secured to said aircraft; said wedge type member having means constructed and arranged adjacent the fore portion thereof for generating an oblique shock wave when said wedge means passes relative to an aerodynamic environment at a predetermined range of supersonic speeds, altitude and when said longitudinal axis forms a predetermined angle of attack; pitot tube means for generating a normal shock wave adjacent said wedge type member and for sensing changes in the pressure losses occurring through the oblique shock wave generated by said wedge type member and the normal shock wave generated by said pitot tube means during said predetermined range of supersonic speeds, altitude and angle of attack; said pitot tube means fixedly secured to the rear portion of said wedge type member and so positioned thereon so as to face the fore portion of said wedge type member; control means secured to said aircraft and operatively connected to said pitot tube means to selectively control the flow of fuel to said engine during said predetermined range of supersonic speeds, altitude and angle of attack depending on the pressure losses sensed by said pitot tube means.

6. The invention of claim 5 wherein said wedge type member comprises: a first inclined surface, a second inclined surface, said first and second inclined surfaces terminating at the fore portion thereof in a leading edge; said pitot tube means secured to said first inclined surface; static orifice means formed in said wedge type member and terminating at said second inclined surface; said control means comprising: a chamber means; bellow means secured within said chamber means; said pitot tube means operatively connected to said bellow means and adapted to transmit pressure differentials therein; said static orifice means operatively connected to said chamber means and operative to transmit static pressures therein; link means operatively connected to said bellow means and adapted to be actuated due to the difference in pressures sensed by said pitot tube means and said static orifice means; said link means operatively connected to a valve means and adapted to increase or decrease the flow of fuel to said engine during said predetermined range of supersonic speeds, altitude and angle of attack.

7. A pressure control system in combination with a vehicle having a longitudinal axis, said control system comprising a wedge type member on said vehicle having at least one inclined planar surface constructed and arranged to form an angle from 10° to 30° with respect to said longitudinal axis, and pitot tube means secured to said wedge type member constructed and arranged in substantial parallel relationship with said surface for sensing pressure changes in an aerodynamic environment through which said vehicle is adapted to fly.

8. A pressure control system in combination with a vehicle having a longitudinal axis and a fore end, said control system comprising a wedge type member secured to said vehicle, said wedge type member comprising a generating means for generating an oblique shock wave when said wedge type member moves relative to an aerodynamic environment at a predetermined range of supersonic speeds and altitude and when said longitudinal axis forms a predetermined angle of attack, an inclined surface constructed and arranged to extend from said generating means away from the fore end of said vehicle at an angle from 10° to 30° with respect to said longitudinal axis and pitot tube means constructed and arranged on said surface a fixed distance from said generating means for generating a normal shock wave adjacent thereto during said predetermined range of supersonic speeds, altitude and angle of attack.

References Cited in the file of this patent

UNITED STATES PATENTS

| | | |
|---|---|---|
| 2,512,790 | Cleveland | June 27, 1950 |
| 2,706,885 | Ostroff et al. | Apr. 26, 1955 |
| 2,765,619 | Peterson | Oct. 9, 1956 |
| 2,776,806 | Brendal | Jan. 8, 1957 |
| 2,797,882 | Servanty | July 2, 1957 |
| 2,892,410 | Sloan et al. | June 30, 1959 |
| 2,899,898 | Goss | Aug. 18, 1959 |